Sept. 5, 1967      A. K. GILLETTE      3,339,530
ANIMAL FEEDING SYSTEM WITH REVERSING AUGER
Filed April 29, 1965      4 Sheets-Sheet 1
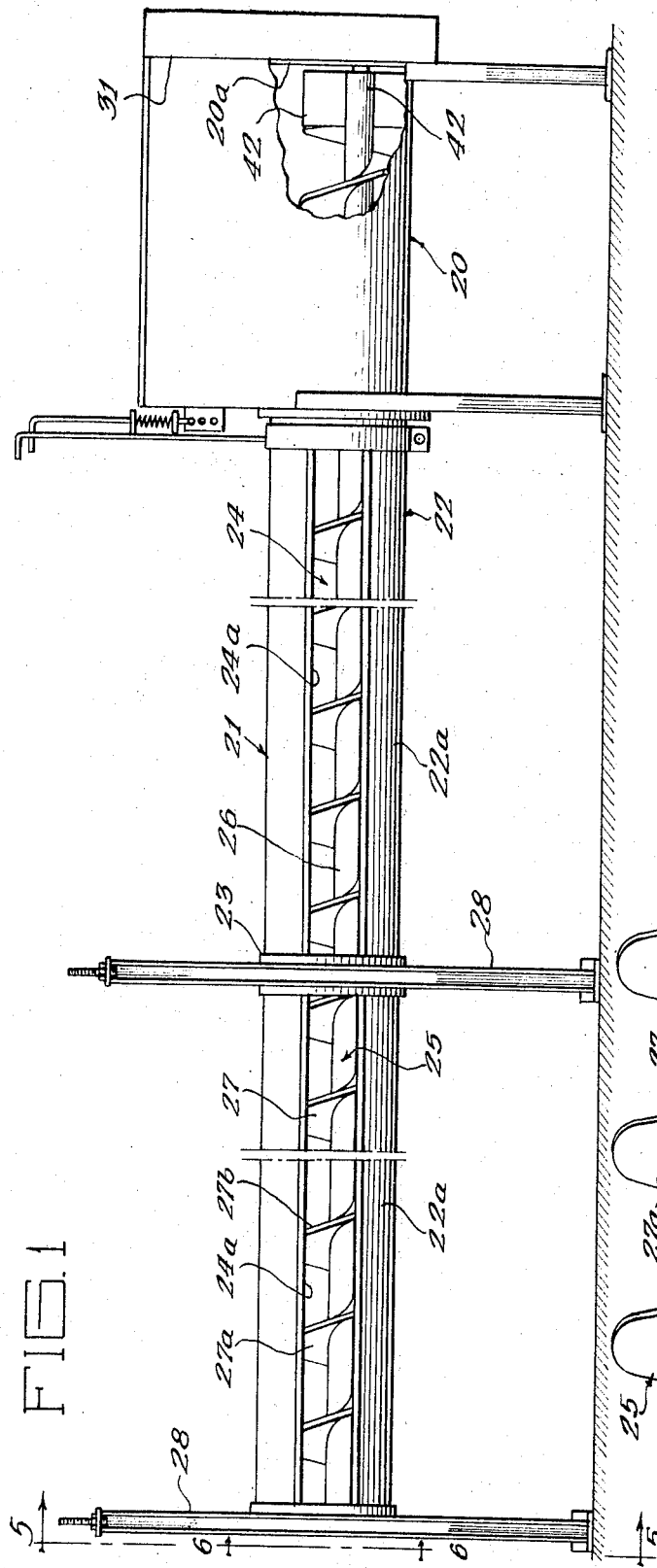
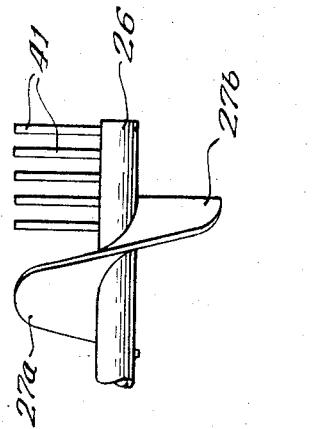
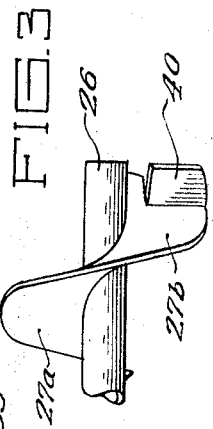
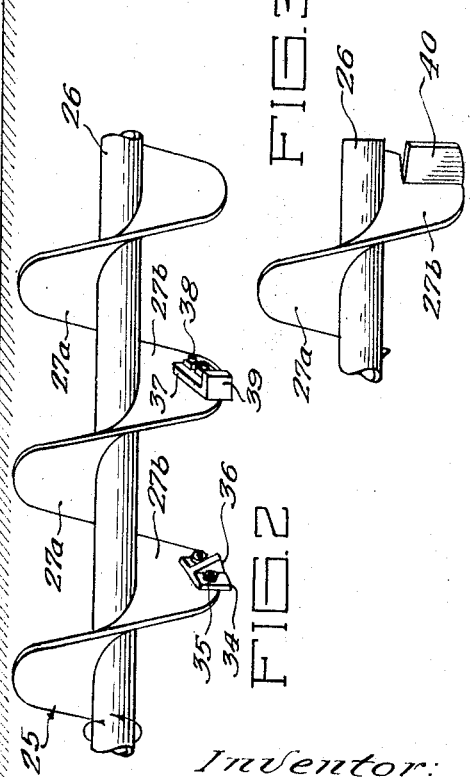
Inventor:
Allen K. Gillette
By: Hofgren, Wegner, Allen,
Stellman & McCord
Attorneys Sept. 5, 1967      A. K. GILLETTE      3,339,530
ANIMAL FEEDING SYSTEM WITH REVERSING AUGER
Filed April 29, 1965      4 Sheets-Sheet 2
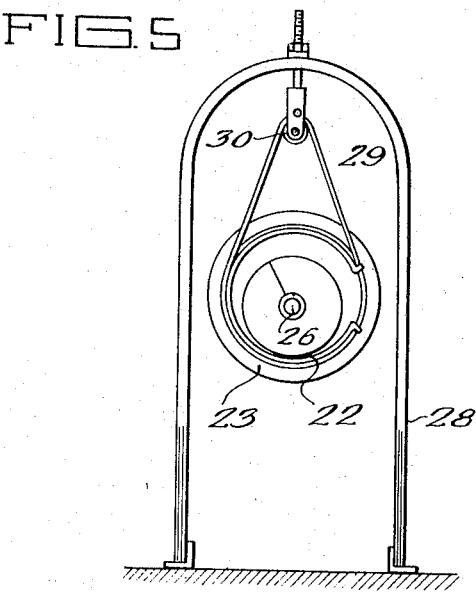
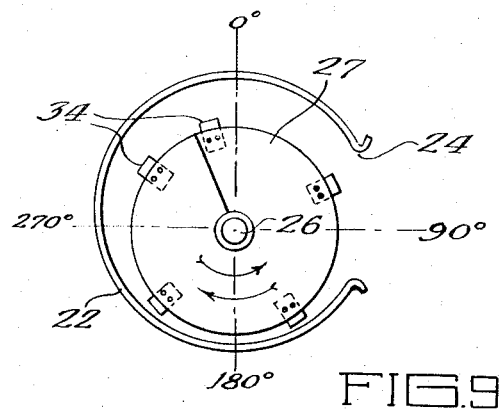
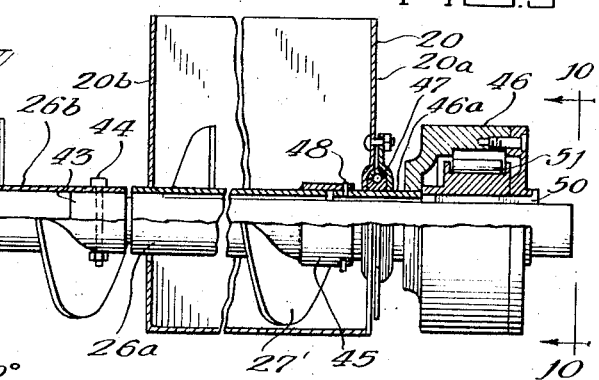
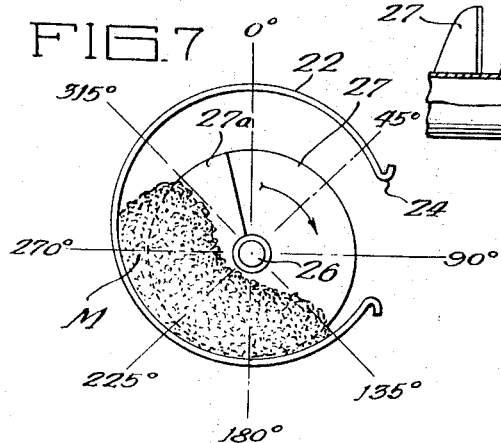
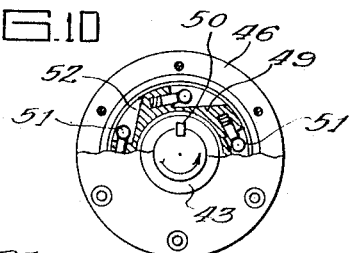
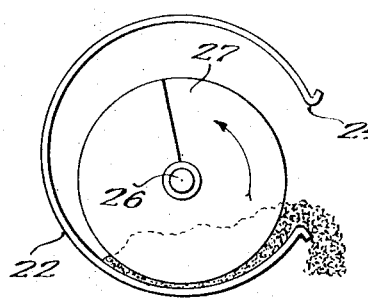

Sept. 5, 1967 A. K. GILLETTE 3,339,530
ANIMAL FEEDING SYSTEM WITH REVERSING AUGER
Filed April 29, 1965 4 Sheets-Sheet 3

Sept. 5, 1967  A. K. GILLETTE  3,339,530
ANIMAL FEEDING SYSTEM WITH REVERSING AUGER
Filed April 29, 1965  4 Sheets-Sheet 4

United States Patent Office 3,339,530
Patented Sept. 5, 1967

3,339,530
ANIMAL FEEDING SYSTEM WITH REVERSING AUGER
Allen K. Gillette, Belvidere, Ill., assignor to Starline, Inc., a corporation of Illinois
Filed Apr. 29, 1965, Ser. No. 451,745
11 Claims. (Cl. 119—56)

This invention relates in general to the conveying and distributing of particulate materials, and more particularly to a new and improved method and apparatus for filling a feed bunk or the like.

In the animal feeder field, it has been conventional in the past to employ conveying and discharging devices which include one or more elongate tubular sections each having a discharge opening therein, and with an auger or screw conveyor rotatably mounted in the sections for advancing particulate material along the sections and outwardly from the discharge openings. It has also been conventional in the animal feeder field to utilize "fill and dump" type of feeding devices, that usually consist of a pivotally mounted elongate housing having a discharge opening. The housing is adapted to contain a quantity of particulate material therein, and after the housing is filled with the desired quantity of material, it is rotated about its longitudinal axis to expel the material.

Each of the above-mentioned types of animal feeders have certain operational deficiencies which have prevented them from being entirely satisfactory in use. For example, in the auger type feeder, difficulty has been encountered in providing a uniform supply of feed throughout the length of the feeder. Another serious disadvantage of the auger type feeder is that feeding usually is initiated at one end of the feeder before it is started at the other end of the feeder, which causes an excessive number of animals to congregate around the end of the feeder at which feeding is initiated. A serious drawback of the fill and dump type of animal feeder is that it has been necessary to provide rather complex and expensive means to uniformly fill the feeder with the desired quantity of feed and to rotate the same. Additionally, it has been necessary to provide rather complex controls to actuate the fill and dump cycle.

The general purpose of the present invention is to provide an animal feeder which will uniformly and substantially simultaneously discharge material from end to end of the device, and which operates in a manner so as to obviate each of the drawbacks mentioned above in connection with known types of animal feeders. Additionally, the present invention is concerned with the provision of a unique method for filling a feed bunk.

An object of the invention is to provide an intermittently operable feed bunk feeder which conveys feed longitudinally of the feeder during one stage of operation, and which discharges feed from the feeder during a second stage of operation.

Another object of the invention is to provide an animal feeder having a rotatable auger with means for reversing the direction of rotation of the auger, so that feed will be conveyed longitudinally of the feeder when the auger is rotated in one direction, and discharge laterally outwardly from the feeder when the auger is rotated in an opposite direction.

A further object of the invention is to provide an animal feeder as described above with means for preventing discharge of material therefrom while the material is being advanced longitudinally of the feeder by rotation of the auger in the first direction, and with means for rapidly discharging substantially the entire amount of material in the feeder when the direction of rotation of the auger is reversed.

A related object of the invention is to convey material along a non-apertured portion of the feeder during advancing of the material along the feeder, and by operation of the conveyor to place the material in communication with an apertured portion of the feeder when it is desired to discharge the material from the feeder.

Still another object of the invention is to provide primarily a longitudinal impetus to the material when it is being advanced along the feeder, and to provide primarily a radial impetus to the material when it is being discharged from the feeder.

A still further object of the invention is to provide a reversible auger feeder as described above with means for preventing accumulation of material at the inlet end of the feeder during the discharge cycle.

Yet another object of the invention is to provide automatic control means for a reversible auger animal feeder as described above.

These and other objects of the invention will hereinafter become more fully apparent from the following description taken in connection with the annexed drawings, in which:

FIG. 1 is a broken, side elevational view with certain parts removed for clarity of illustration;

FIG. 2 is an enlarged fragmentary view of a first auger embodiment;

FIGS. 3 and 4 are fragmentary side elevational views similar to FIG. 2, and showing modified forms of the auger;

FIG. 5 is a view taken generally along line 5—5 of FIG. 1;

FIG. 6 is a view taken generally along line 6—6 of FIG. 1;

FIG. 7 is a view similar to FIG. 6, and showing the disposition of feed in the conveyor when the auger is rotated in a first direction;

FIG. 8 is a view similar to FIG. 7, and illustrating the discharge phase of auger operation;

FIG. 9 is a fragmentary side elevational view, partially in section, showing one form of auger drive means;

FIG. 10 is a view taken generally along line 10—10 of FIG. 9;

Figure 11:
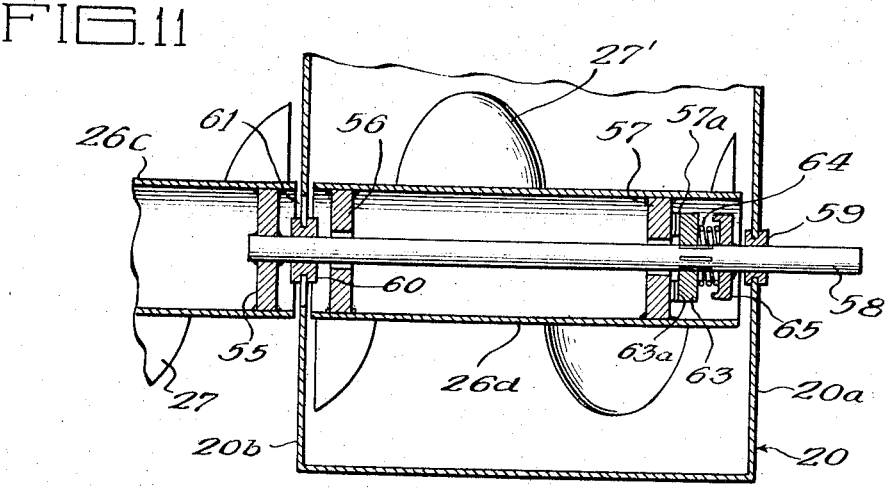
FIG. 11 is a view similar to FIG. 9, and showing a modified form of the auger drive means.

While this invention is susceptible of embodiment in many different forms, there is shown in the drawings and will herein be described in detail one specific embodiment of the invention together with modifications thereof, with the understanding that the present disclosure is to be considered as an exemplification of the principles of the invention and is not intended to limit the invention to the embodiments illustrated. The scope of the invention will be pointed out in the appended claims.

Referring now to the drawings, and particularly to FIGS. 1 and 6, the illustrated embodiment of the animal feeder is seen to comprise a hopper 20 of generally conventional construction that includes spaced rear and front walls 20a and 20b, respectively. An opening, not shown, is formed in hopper wall 20b; and an elongate conveyor, indicated generally at 21, extends outwardly from hopper 20 and communicates with the interior thereof through the opening in wall 20b. As is well known in the art, hopper 20 is adapted to be filled with particulate material M such as forage or the like, from a feed supply source.

Conveyor 21 includes a housing 22 that is defined by a plurality of generally identical end to end tubular cylindrical sections 22a, with adjacent sections being secured to one another by flanged connector means 23 as disclosed in detail in the co-pending application of Ferris et al., Ser. No. 263,309. Each section 22a includes an elongate opening 24a which extends substantially from end to end thereof, and which faces laterally outwardly from one side of the conveyor, so the housing had a substantially continuous opening 24. As is explained in detail in the above-mentioned patent application, the conveyor sections 22a are adjustable relative to one another, so that the disposition of the openings 24a may be varied as desired. An auger 25 is positioned in the conveyor 21, and consists of a shaft 26 to which is secured helicoid flighting 27. In the embodiment shown in FIG. 1, the inner end of the auger 25 is positioned in the hopper 20, and the auger functions to advance material from the hopper 20 along the conveyor 21 upon rotation thereof. The conveyor 21 is supported from a plurality of spaced, generally U-shaped standards 28 by means of cables 29 which are looped under the conveyor sections and over pulleys 30 that are adjustably secured to the standards 28. The means for supporting the conveyor 21 are set forth in detail in the above-mentioned patent application.

Drive means for rotating the auger 25 and control means therefor are provided in a housing 31 which is fixed to the rear wall 20a of hopper 20. In the illustrated embodiment right-hand flighting 27 is provided on auger 25, so that clockwise rotation of the auger (as viewed in FIGS. 6 and 7) will convey the particulate material outwardly from the hopper 20 along the conveyor housing 22. As the auger is rotated the material M is given both radial and longitudinal impetus; and as can be seen in FIG. 7, this causes the material to be positioned principally in the lower left-hand quadrant of the conveyor sections, and more particularly to assume a position between 135° and 315° or about 4:30 to 10:30 on a clock. It will be readily understood that, if the housing 22 is positioned with the opening 24 disposed generally between 45° and 130°, i.e., between about 2 and 4 o'clock, little or no discharge of material can take place as the material is advanced along the conveyor. It will also be readily understood that if the direction of rotation of the auger 25 is reversed, the material M will assume a position generally between 45° and 225°. Thus, when the entire length of the conveyor is filled with material, it is only necessary to reverse the rotation of the auger to discharge the material from the conveyor housing through the opening 24 as seen in FIG. 8.

During the conveying phase of feeder operation the material M is carried by a forward face 27a of the flighting 27. During the conveying phase of the feeder operation it is desired that the material M be advanced longitudinally of the conveyor as efficiently as possible, and to this end, means are provided for maximizing the longitudinal impetus given to the material M, and to minimize the radial impetus given to the material M. In order to increase the forward component of movement to the material M during the conveying phase, it is desirable to reduce the coefficient of friction between the flighting face 27a and the material M. To this end, the present invention contemplates that the inner surface of the channel sections and/or the flighting face 27a be coated with a low friction material, such as chrome, Teflon, or any equivalent material.

During the discharge phase of feeder operation, the material M is carried by the rear face 27b of the flighting, and it is desirable to maximize the radial impetus given to the material and to minimize the longitudinal impetus given to the material. This enables the entire quantity of material in the conveyor to be quickly discharged without a substantial buildup of material in the hopper 20. The radial impetus given to the material may be increased by means on the flighting face 27b that increases the coefficient of friction between the flighting and the material M. To this end, flighting face 27b may be painted with paint containing grit such as sand; or rubber or plastic may be applied to the flighting face 27b. Alternatively, means may be associated with the auger for shoveling or scooping the material from the conveyor sections during the discharging phase of the feeder operation.

As is shown in FIG. 2, material scoops 34 in the form of T-members are secured to flighting face 27b by bolts 35. Scoops 34 include outwardly projecting scoop portions 36 which extend generally longitudinally of the conveyor, and which are adapted to scoop material out of the conveyor when the auger is rotated. As can be seen in FIG. 6, scoops 34 project radially outwardly from the outer periphery of flighting 27, and ride upon the inner surface of the conveyor to form bearing means for the auger. A modified form of scoop 37 is also shown in FIG. 2 secured to flighting face 27b by bolts 38. Scoop 37 is an angle member having a scoop portion 39 that extends generally longitudinally of the conveyor for scooping material outwardly therefrom during rotation of the auger. Another alternate means of scooping material from the conveyor during the discharging phase is shown in FIG. 3, and includes a flange 40 that is struck outwardly from the flighting, and which extends substantially normally to the flighting face 27b. A further alternate means is shown in FIG. 4 to include a plurality of spaced fingers 41 extending generally radially outwardly from the auger shaft 26 between the flighting convolutions. It will be understood that fingers 41 are preferably angled in such a way so as to aid material advance when conveying, and to provide mainly a radial movement of material when discharging.

In order to prevent material from accumulating at the rearward end of the hopper 20 during the discharging phase of the feeder operation, paddles such as those shown at 42 in FIG. 1, may be provided on the innermost portion of the auger shaft 26 adjacent hopper rear wall 20a. Flippers 42 extend generally radially outwardly from the auger shaft 26, and throw the material upwardly, instead of to the right, during the discharging operation. It will be understood, of course, that the auger flighting may be deformed, as shown at 40 in FIG. 3, adjacent the innermost end of the auger shaft; or projecting fingers, such as shown at 41 in FIG. 4 may be provided at the innermost end of the auger shaft in lieu of flippers 42.

As an alternate means for preventing the accumulation of material in the hopper 20 during the discharging phase of feeder operation the auger shaft may be formed of two portions, with a first portion 26a positioned in hopper 20, and a second portion 26b outwardly of the hopper 20, and one-way clutch means (FIGS. 9 and 10) may be provided to prevent rotation of the shaft portion 26a during the discharge of material. It will be understood that the flighting 27' on shaft portion 26a has the same pitch as the flighting 27 on shaft portion 26. Shaft portion 26b is hollow, and receives therein a solid shaft 43 which extends through hopper walls 20a and 20b, and which is bolted at 44 to shaft portion 26b. A sleeve 45 received the innermost end of shaft portion 26a and is secured thereto as by welding or the like. An outer clutch member 46 includes a portion 46a of reduced diameter which is rotatably mounted in the rear wall 20a of hopper 20 by a suitable bearing 47, and which is secured to sleeve 45 as by pin 48. An inner clutch member 49 is fixed to shaft 43 by a key 50, and inner clutch member 49 carries a plurality of longitudinally extending rollers 51 in wedge shaped notches 52 in the outer periphery thereof. When shaft 43 is rotated in a counterclockwise direction as viewed in FIG. 10, rollers 51 are wedged against the inner surface of outer clutch member 46, and auger shaft sections 26a and 26b rotate together, because of the pinned connection between the outer clutch member 46 and the sleeve 45. When the shaft 43 is rotated in a clockwise direction, the rollers 51 are loosely received in the notches in the periphery of the inner clutch member 49, and the shaft 43 and auger shaft 26b rotate, while the outer clutch member 46 and auger shaft portion 26a remain stationary. Thus, it will be readily apparent that there will be no conveying of feed within the hopper during the discharge cycle, and there will be no substantial accumulation of material adjacent hopper wall 20a.

Figure 12:
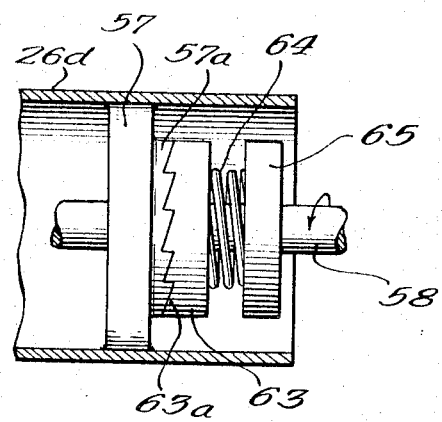
FIG. 12 is an enlarged, fragmentary detail view of the clutch means illustrated in FIG. 11.

An alternate clutch means for preventing the accumulation of material within the hopper 20 during the discharge cycle is shown in FIG. 11. An auger shaft portion 26c has a head plate 55 welded in its end portion adjacent the front wall 20b of hopper 20; and an auger shaft portion 26d includes head plates 56 and 57 welded in its end portions adjacent hopper front wall 20b and hopper rear wall 20a, respectively. A driven shaft 58 which extends through the hopper 20 is rotatably mounted in wall 20a in a bearing 59 which is secured in the wall, and in wall 20b in a bearing 60 which is supported in a spider 61. The shaft 58 passes freely through the sleeves 56 and 57 and has its end welded into the head plate 55. An axially movable plate 63 is mounted on shaft 58 rearwardly of head plate 57; and as best seen in FIG. 12, head plate 57 is provided with ratchet teeth 57a which cooperate with ratchet teeth 63a on plate 63 to drivingly couple sleeve 57 and plate 63 for movement together upon rotation of plate 63 is a first direction, and to enable plate 63 to ratchet over head plate 57 when plate 63 is rotated in an opposite direction. A spring 64 acts between a collar 65 that is fixed on shaft 58 rearwardly of plate 63, and the rear face of plate 63 to urge the plate into engagement with sleeve 57. Thus, when shaft 58 is rotated as shown by the directional arrow in FIG. 12, plate 63 will drive sleeve 57, shaft portion 26a, and shaft portion 26b to feed material outwardly from the hopper 20 along the conveyor 21. When shaft 58 is rotated in a counterclockwise direction, as seen in FIG. 8, plate 63 ratchets over head plate 57 so that the hopper auger shaft portion 26d does not rotate, and there is no accumulation of material in the hopper 20 during the discharging phase of feeder operation.

Figure 13:
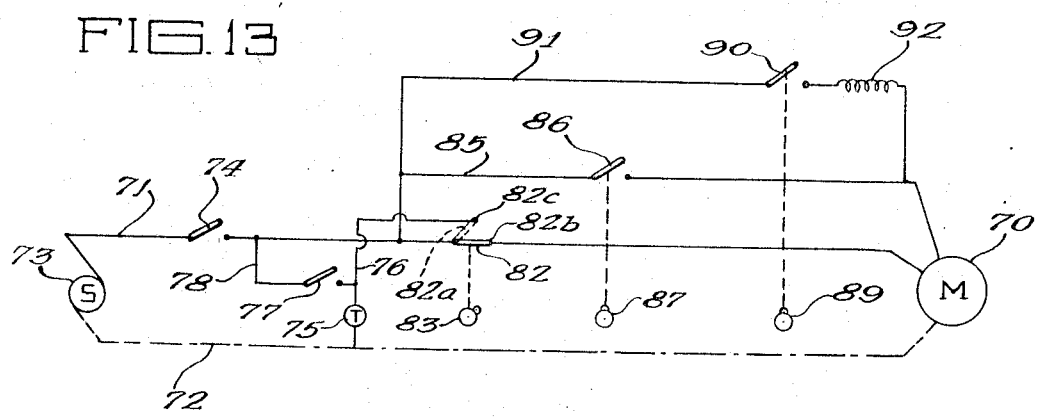
FIG. 13 is a schematic electrical diagram of control means for the reversible auger.

Means are shown in FIGS. 13–16 for automatically controlling the operation of the animal feeder described above, and it will be understood that the control means are positioned in the housing 31 fixed to the hopper 20. A reversible drive motor 70 is shown in FIG. 13, and conventional drive means couple the output shaft of motor 70 to the auger drive shaft. Leads 71 and 72 connect the drive motor to an appropriate source of electrical energy 73, and a master switch 74, which may be manual or timer controlled, is provided in line 71 for controlling the operation of motor 70. Thus, when the switch 74 is closed a circuit is completed to the motor 70, and the auger 25 is rotated in a direction to convey feed from the hopper 20 along the conveyor.

Figure 14:
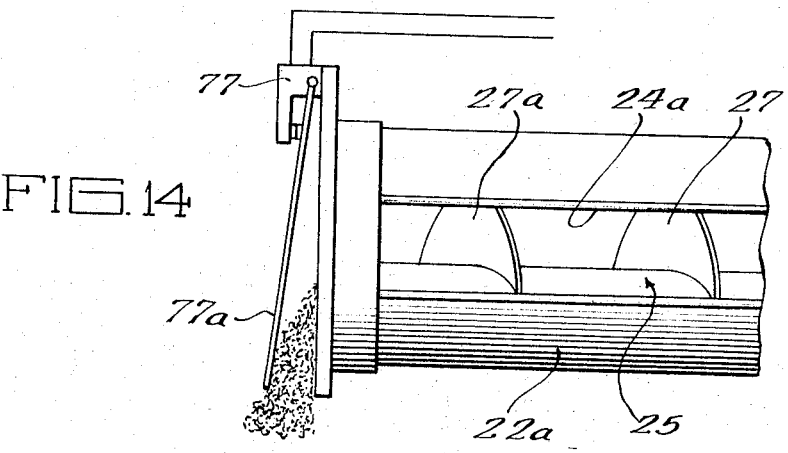
FIG. 14 is a fragmentary side elevational view of the conveyor showing a feed sensing switch.
Figure 15:
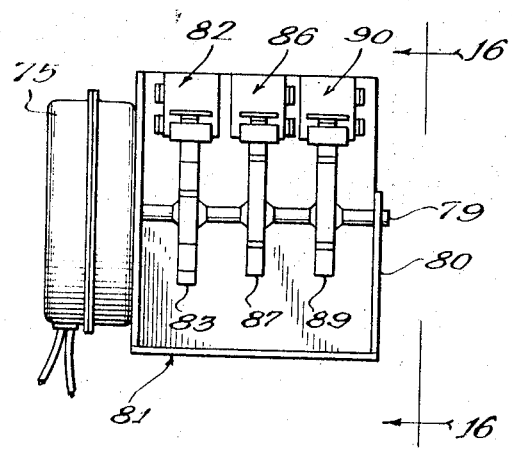
FIG. 15 is a side elevational view, partially in section, of a timer motor and cam device for controlling the operation of the reversible auger.
Figure 16:
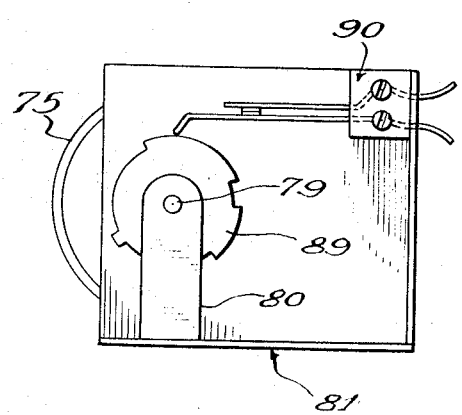
FIG. 16 is a view taken generally along line 16—16 of FIG. 15.

Means for initiating the discharge phase of feeder operation includes a timer motor 75 that is connected in a line 76 extending between lines 71 and 72. As shown in FIG. 14, a switch 77 (normally open) may be provided on the outermost conveyor housing section, with a pivotally mounted switch operating paddle 77a extending across the open outer end of said conveyor housing section, so that when feed is pushed out said end by the auger the switch is closed to complete a circuit through a line 78 to the timer motor 75. As seen in FIG. 15, the timer 75 has a shaft 79 journaled in a bracket 80 that extends upwardly from a support frame 81 for the timer motor. A normally closed switch 82 is connected in line 71, and is operatively responsive to rotation of a cam 83 on the timer motor shaft 79. Switch 82 is a two-position switch, and as seen in FIG. 13 it has a contact arm 82a movable between a contact 82b in line 71 and another contact 82c in line 76, so that when cam 83 actuates switch 82 to interrupt the circuit to the motor 70, a circuit is completed via contact 82c to the timing motor 75 to retain the same energized. A line 85 is connected between line 71 and the reversable motor 70, and a normally open switch 86 is provided in line 85. Switch 86 is operatively responsive to the rotation of a second cam 87 on timer motor shaft 79, and cam 87 is formed so as to close switch 86 shortly after switch 82 has been opened, so that when the switch 86 is closed a circuit is completed to the motor 70 to reverse the direction of rotation thereof.

A third cam 89 may be mounted on timer motor shaft 79 for interrupting the feed input into the hopper during the discharge cycle. To this end, a switch 90 is provided in a line 91 which is connected in parallel with the switch 86. A solenoid 92 is provided in line 91, and is adapted to control a feed input valve (not shown) into the hopper 20. Cam 89 is preferably arranged to close the switch 90 a short time before switch 86 is closed by cam 87 so that the material input to the hopper 20 will be stopped prior to the initiation of a discharge cycle.

The foregoing detailed description has been given for clearness of understanding only and no unnecessary limitations should be understood therefrom as modifications will be obvious to those skilled in the art.

I claim:

1. The method of operating an auger type feeder having a housing with an opening along one side to fill a feed bunk, comprising the steps of: rotating the auger in said housing in a first direction to convey material along the closed side of said housing; and reversing the direction of rotation of said auger to discharge material laterally from the opening in the side of said housing.

2. The method of filling a feed bunk having a hopper at one end thereof, comprising the steps of: positioning a housing with a closed side and an open side above the feed bunk and in communication with said hopper; introducing material from said hopper into said housing by rotating an auger conveyor having a first portion in said hopper and a second portion in said housing in a first direction to convey material outwardly from said hopper and along the closed side of said housing; and reversing the direction of rotation of the second portion of said auger conveyor while maintaining the first portion stationary to discharge material from the open side of said housing without conveying material in said hopper.

3. The method of filling a feed bunk comprising the steps of: positioning a housing with a closed side and an open side above the feed bunk; introducing material into said housing by rotating an auger conveyor in said housing in a first direction to convey material along the closed side of said housing; and reversing the direction of rotation of said auger conveyor to discharge material laterally from the open side of said housing.

4. The method of distributing material from an elongate conveyor that has a housing with an aperture in one side comprising the steps of: introducing material into said housing; moving said material longitudinally of said housing while confining it to a non-apertured portion of the housing; and moving said material laterally within the housing to discharge said material from the housing through the aperture.

5. A device for conveying particulate material comprising: an elongate housing having a discharge opening in one side; an auger conveyor rotatably mounted in said housing; means for rotating said auger conveyor in a first direction to advance material along a portion of said housing which is remote from said discharge opening; and means for reversing the direction of rotation of said auger conveyor to discharge said material from said housing through said discharge opening.

6. A device for conveying particulate material comprising: an elongate housing having a discharge opening in one side; means for conveying said material longitudinally along a portion of said housing which is remote from said opening; and means for discharging said material from said housing through said discharge opening while maintaining said housing stationary.

7. Animal feeding apparatus comprising: a material hopper having spaced end walls; an elongate housing communicating with said hopper through one end wall and having a discharge opening in one side; an auger conveyor rotatably mounted in said housing and having a portion positioned in said hopper for conveying material outwardly therefrom; means for rotating said auger conveyor in a first direction to advance material from said hopper along a part of said housing which is remote from said discharge opening; means for reversing the direction of rotation of said auger conveyor to discharge said material from said housing through said discharge opening; and means for preventing building up of pressure between said auger and the other hopper end wall during the discharge of material from said conveyor.

8. Apparatus as defined in claim 7 wherein said last named means includes at least one material engaging element connected to the auger and located in said hopper for converting longitudinal movement of material in said hopper to radial movement during discharge.

9. Apparatus as defined in claim 8 wherein a plurality of said elements are provided on said auger radially thereof.

10. Animal feeding apparatus comprising: a material hopper; an elongate housing communicating with said hopper and having a discharge opening in one side; an auger conveyor having a first portion rotatably mounted in said housing and a second portion rotatably mounted in said hopper; clutch means coupling said first and second auger portions for rotation together in one direction and allowing said first auger portion to rotate in an opposite direction independently of said second auger portion; means for rotating said auger first portion in said one direction to advance material from said hopper along said housing; and means for reversing the direction of rotation of said auger first portion to discharge said material from said housing through said discharge opening without conveying material in said hopper.

11. Apparatus for discharging particulate material from a source thereof along an elongated discharge station comprising: an elongated, generally horizontally disposed conveyor tube adapted to communicate with said source for receiving material therefrom into one end of the tube, said tube having an elongated opening in the side wall thereof extending longitudinally of the tube in vertically spaced relationship with the bottom of the tube; an elongated, rotatable screw in the tube, said screw including a helical vane having a leading surface and a trailing surface, the leading surface being configured to push the material away from said opening and toward the other end of the tube when the screw is rotated in one direction and the trailing surface being configured to push the material toward the opening when the screw is rotated in the opposite direction; and reversible drive means operably coupled with the screw for driving the latter.

References Cited

UNITED STATES PATENTS

| | | | |
|---|---|---|---|
| 769,947 | 9/1904 | Kramer | 198—110 |
| 1,157,775 | 10/1915 | Grieves | 56—377 |
| 1,255,276 | 2/1918 | Barnett et al. | 198—213 |
| 2,554,769 | 5/1951 | Arnold | 198—213 X |
| 2,555,066 | 5/1951 | Thomas | 198—213 X |
| 2,663,405 | 12/1953 | Messing | 198—213 |
| 2,746,083 | 5/1956 | King | 198—213 X |
| 2,864,593 | 12/1958 | Shoup | 198—213 X |
| 2,867,314 | 1/1959 | Hansen | 198—64 |
| 3,149,610 | 9/1964 | Van Peursem | 119—56 X |
| 3,223,227 | 12/1965 | Dudte | 198—64 |
| 3,263,801 | 8/1966 | Dudte | 198—213 |

ALDRICH F. MEDBERY, *Primary Examiner.*

SAMUEL KOREN, *Examiner.*